United States Patent [19]

Ware

[11] Patent Number: 5,061,418
[45] Date of Patent: Oct. 29, 1991

[54] THERMAL EXPANSION RESIN TRANSFER MOLDING

[75] Inventor: Maximilian Ware, Minneapolis, Minn.

[73] Assignee: Tertm, Inc., Winona, Minn.

[21] Appl. No.: 436,776

[22] Filed: Nov. 15, 1989

Related U.S. Application Data

[63] Continuation-in-part of Ser. No. 153,705, Jan. 22, 1988, abandoned, which is a continuation-in-part of Ser. No. 699,162, Feb. 7, 1985, abandoned.

[51] Int. Cl.$^5$ ............................................. B29C 67/00
[52] U.S. Cl. .................. 264/46.6; 264/46.4; 264/257; 264/321; 264/327
[58] Field of Search ............. 264/46.4, 46.6, 46.9, 264/254, 257, 255, 259, 321, 327

[56] References Cited

U.S. PATENT DOCUMENTS 4,128,963 12/1978 Dano ............................ 264/46.4 X
4,560,523 12/1985 Plumley et al. ..................... 264/102

Primary Examiner—David A. Simmons
Assistant Examiner—Thi Dang
Attorney, Agent, or Firm—Oblon, Spivak, McClelland, Maier & Neustadt

[57] ABSTRACT

A method of forming a composite sandwich core molded article, including forming a thermo-elastic rigid foam core into a desired shape, wrapping the preformed foam core with a fabric, placing said wrapped preformed foam core in a mold whose inner confining surfaces form the shape of the final article, injecting a liquid thermosetting resin into the mold such that the thermosetting resin surrounds and wets the fabric wrapped about the preformed foam core, heating the mold to a temperature sufficient to expand the rigid foam core to compress the fabric wrapped surface of the foam core against the inner confining surfaces of the mold; and cooling the mold and removing the article from the mold.

36 Claims, 1 Drawing Sheet

THERMAL EXPANSION RESIN TRANSFER MOLDING

This invention is a continuation-in-part of application Ser. No. 07/153,705 filed Jan. 22, 1988, now abandoned, which in turn is a continuation-in-part of application Ser. No. 06/699,162, filed Feb. 7, 1985, now abandoned.

BACKGROUND OF THE INVENTION

1. Field of the Invention

The present invention relates to a method of preparing shaped objects from a thermally expandable foam.

2. Background of the Prior Art

One technique for preparing molded objects of various shapes is known as the thermal expansion molding process (TEM). This method has the unique feature of providing pressure necessary for forming finished shapes by use of a thermally expandable (non-reversible) material placed within the female cavity of a mold. In this process, a mandrel (of a thermally expandable material such as silicone rubber) is wrapped with a resin preimpregnated fabric material. This wrapped mandrel is then inserted into a closed cavity mold. Then, the mandrel, mold or both mandrel and mold are heated with the result that the material of the mandrel expands thereby causing the material to expand against the female cavity mold. Pressure is created within the cavity by the confining surfaces of the mold. Significant pressures can be generated by this process which leads to high quality molded objects, even of complex shapes which are free of voids.

The conventional TEM process has several advantages over vacuum bag and autoclave curing of objects. An important advantage is that the TEM process obviates the need for the capital investment required to support autoclaves. Moreover, significant labor savings can be realized by the fact that the expensive bagging and debagging operations associated with autoclave processes are not necessary. Still further, the rate of rejection of product is reduced because of the above operational advantages, since bag leaks are a significant problem of autoclave curing operations. TEM processing is especially well suited in manufacturing parts of complex shapes because it is especially difficult to bag parts of complex shapes.

Disadvantages of conventional TEM processing which utilizes silicone rubber mandrels include the fact that rubber tooling doe not have sufficient long term stability. That is, during repeated thermal pressure cycling, the rubber mandrels can experience a permanent compression set, which limits their life. Provisions must also be made in the part being manufactured to remove the mandrels after curing. This can compromise the shape or function of the part. Another disadvantage of the conventional TEM process is that a resulting hollow part of the object may lack sufficient structural strength. Still another disadvantage of rubber tooling is that if the rubber tooling is improperly sized, or if the cure cycle temperatures are exceeded, rubber tooling is capable of generating pressures sufficiently high to deform the tooling or ruin the mandrel. Yet another disadvantage of conventional TEM processing is that since the mandrels provide an interior mold surface, any imperfections in the rubber such as cuts, gouges, and the like will be transmitted to the part.

Several techniques are known for manufacturing paddles, which are useful in rowing, canoeing and the like, that are light in weight but yet structurally strong. Virtually all of these paddles are made either of wood, or they have an aluminum or fiberglass shaft with a blade of compression molded laminate or injection molded plastic. These paddles typically weight between 1 to 2.5 pounds. In another method of light weight paddle construction as described in U.S. Pat. No. 4,061,106, a core material such as balsa wood is cut to the shape of a paddle blade and then the blade is formed to the paddle shaft. Thereafter, the core is coated with a first layer of resin which waterproofs the wood and provides the required strength for the paddle. After the applied resin layer dries, the paddle blade is coated with a second layer of resin and then reinforcing fibers are laid onto the surface of the still wet resin coating. Upon drying of the resin coating, a complete paddle is obtained. While this method of paddle construction provides paddles of lighter weight construction than conventional paddles, the process is till relatively complex and involves a number of operational steps. A need therefore continues to exist for a relatively simpler way of manufacturing light weight paddles, as well as other structures, which involve fewer manufacturing steps.

SUMMARY OF THE INVENTION

Accordingly, one object of the present Invention is to provide a method of manufacturing paddles or oars of light weight which are useful in aquatic events by a molding process involving synthetic resin materials.

Another object of the present invention is to provide a method of manufacturing paddles or oars of lighter weight which are useful in aquatic events by a molding process involving synthetic resin materials.

Briefly, these objects and other objects of the present invention as hereinafter described will become more readily apparent can be attained by a method of forming composite molded articles comprising forming a thermoelastic rigid foam core into a desired shape, wrapping the preformed foam core with a fabric, placing said wrapped preformed foam core in a mold whose inner confining surfaces form the shape of the final article and which provides the capability of heating selected areas of said preformed foam core, injecting a liquid thermosetting resin into the mold such that the thermosetting resin surrounds and wets the fabric wrapped about the preformed foam core, selectively heating desired areas of the mold to a temperature sufficient to expand the rigid foam core to compress the fabric wrapped surface of the foam core against the inner confining surfaces of the mold and completing the heating of the rigid foam core to complete the molding process, and cooling the mold and removing the article from the mold. This process is hereinafter referred to as the thermal expansion resin transfer molding process or TERTM.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2:
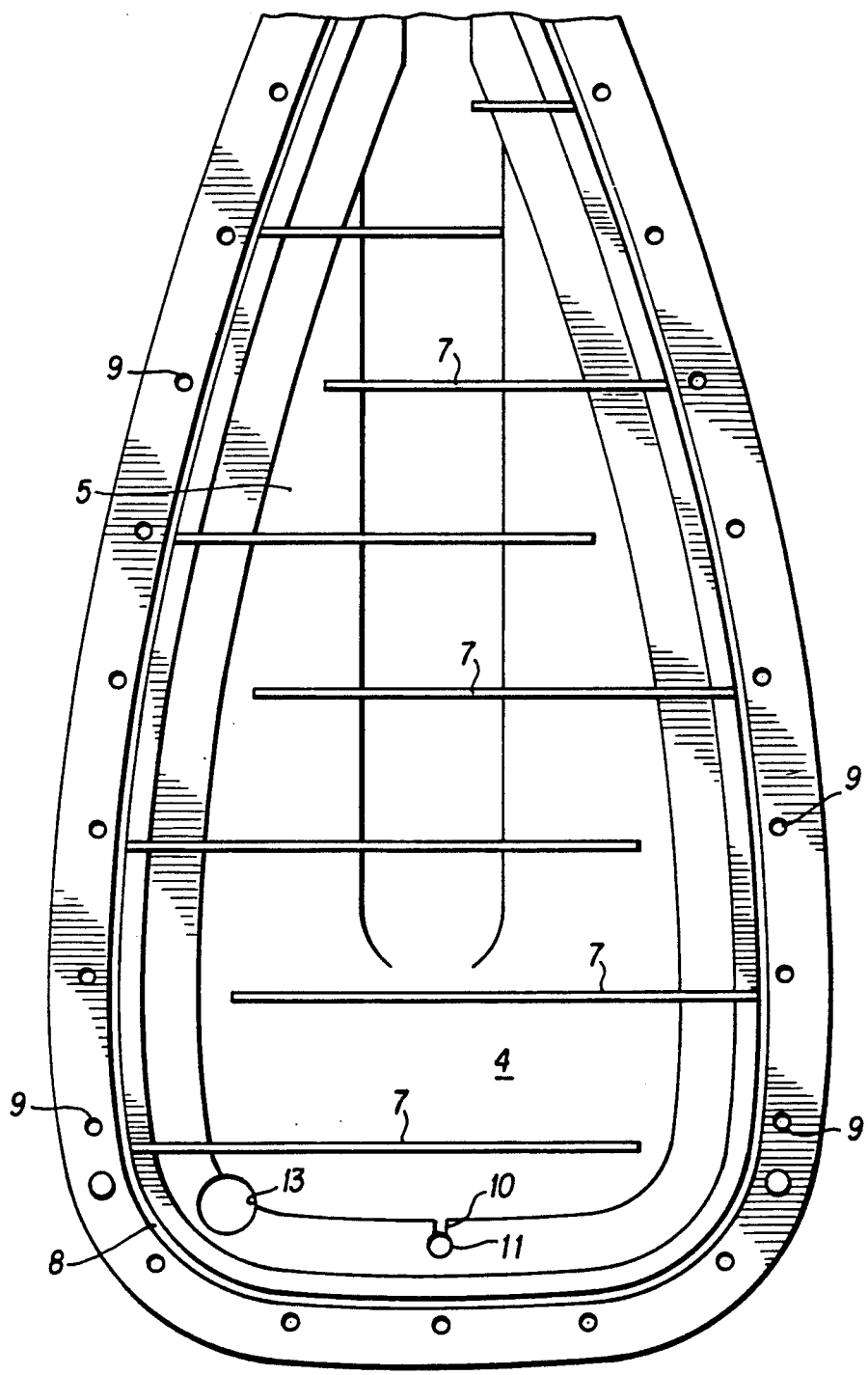
FIG. 2 is a top view of the mold of FIG. 1.

The fabrication process of the present invention can be successfully used to prepare consumer products of widely differing shapes which are usually made from wood, metal and plastic. In fact, an advantage of the present TERTM process is that it provides for flexibility in the manufacture of new products which are unsuitable or impractical for manufacture from wood, metal or many plastic materials. Moreover, the TERTM process effectively utilizes light weight materials in an economically attractive manner to prepare sandwich core products of light weight, strength and stiffness. Thus, the utility of the process is in the manufacture of articles and objects of widely varying design and shape which are themselves useful in many applications such as parts in the construction of aircraft, motorized, as well as unmotorized vehicles, recreational devices, and the like.

In the first stage of the TERTM process of the invention, a thermo-elastic rigid foam core is formed into a desired shape by a convenient method. Usually, the rigid foam is shaped by direct coating molding or compression molding with heat. Since the TERTM process can be utilized to form products of widely varying shapes, it is apparent that the shape of the rigid foam core can be of any convenient shape to expand into the shape of the final product within the mold.

In selecting the polymer material for the core, factors which enter into the determination are the heat deflection temperature of the finished product, the weight desired for the final product, the cost of the polymer material, and the cycling time desired. The foam core material must be a material which is non-reversibly heat expandable at elevated temperatures and yet is stable at ambient air temperatures. Suitable polymer materials include polyvinyl chloride, selected polyurethane materials, polyimides and the like. Any of a wide variety of foamed resins can be caused to undergo additional expansion by application of heat, by virtue of a blowing agent. Other polymers include foamed styrene, polymethyl methacrylate, etc. In general, such resins can be obtained as commercial items. These materials have thermo-elastic properties which make them suitable for use as core materials. Polyvinyl chloride and the polyurethanes have the advantages that they can be cycled much faster at lower processing temperatures and they cost less than the polyimides. However, these materials produce heavier products because of the increased densities required to compensate for lower compressive and shear properties. The other major differences between the foamable materials are the expansion pressure which they exert on the internal laminating materials as they expand within the mold. The high density polyimide material having a density up to 7 $lb/ft^3$ is capable of exerting over 100 psi of pressure, while polyvinyl chloride and polyurethane pressures are significantly lower with polyurethane expansion pressures being as low as several psi.

When either polyvinyl chloride or polyimide is used as the core material, a shaped object is cured from slab stock of the material and roughly shaped if necessary. The roughly shaped material is then heated in an oven for a time sufficient to soften the cell structure of the object, and the object is then quickly transferred to a room-temperature compression mold for more precise shaping. In fact, for articles of relatively complex shape, several compression molds may have to be used to form segments which may be joined to provide a complete core for later use. On the other hand, if a polyurethane material is selected as the core or mandrel material, mechanical preshaping of the foam core from slab stock can be eliminated by molding the expandable core directly from a closed mold corresponding in shape to, but smaller in dimension than the final shape. Polyurethane is available in free rise densities ranging from 2 to 10 $lb/ft^3$. Upon subsequent exposure to heat in a production mold, the polyurethane material will expand in a fashion similar to pre-compressed polyvinyl chloride and polyimide, but at significantly lower pressures.

After appropriate core material selection, the preformed rigid core is wrapped with fabric reinforcement. The fabric can be dry or prepregged if desired or a combination of both dry fabric and prepreg may be used. The dry fabric reinforcing material can be unidirectional, woven, knitted or braided material. In fact a suitable structure can be attained by wrapping the core with filaments. The dry fabric which is selected can be prepared from a variety of materials such as graphite, aramid, fiberglass and polyester. Fabric selection also depends on how they perform when impregnated with the thermoset resin used subsequently in the process. Awareness of the various forms of fabric such as braids, knits, woven unidirectional materials and traditional woven materials will allow the manufacturer to more fully utilize specific properties of the fabric to the best advantage possible, particularly with respect to raw material costs and processing.

The utilization of hybrid braided fabric reinforcements presents particular opportunities in the fabrication of complex tubular-shaped products by TERTM. The type, orientation and quantity of reinforcing fibers all contribute a significant role in the finished product properties of strength, stiffness and durability.

One embodiment of wrapping material is a prepreg which is an epoxy resin soaked fabric. A prepreg is prepared by immersing a fabric into an organic solvent (acetone) solution of epoxy resin, then removing the cloth once impregnated and finally dried. The prepreg which is obtained is tacky and semisolid. (Since the epoxy resin contains a curing agent, the prepreg is usually stored at low temperatures in order to prevent premature curing of the resin.) The nature of the curing process of the prepreg material must be such that its curing temperature matches closely with the temperature at which the core or mandrel material expands during the actual molding process.

The preferred embodiment of core wrapping material as far as the TERTM process is concerned is dry fabric because of its lower costs in comparison to prepregs and also because many more forms of fabric are available in the dry form than are available in the prepreg.

Once the mandrel or core has been wrapped in the fabric, the wrapped structure is placed within a mold cavity. With regard to the placement of the fabric wrapped mandrel in the mold cavity, it is important that the wrapped mandrel be slightly undersized relative to the interior size of the mold cavity such that the structure slightly rattles within the mold cavity. If the wrapped mandrel is oversized or if the mold is undersized such that no rattling of the wrapped mandrel is observed when the mold is shaken, this means that when the liquid epoxy is injected into the mold, it will not wet the entire surface of the wrapped fabric. This in turn means that an article of incomplete, irregular or imperfect surface features will be obtained which makes the product unacceptable.

The clearance between the wrapped mandrel and the confining mold surfaces should especially be no less than about 0.127 mm nor more than about 0.76 mm.

Once the wrapped mandrel is positioned within the mold, a low viscosity thermosetting resin is injected into the mold such that the fabric and mandrel is surrounded and wetted impregnated and covered) by the thermosetting resin. The thermosetting resin which is used should have a viscosity of about 8000 cp or less at ambient temperatures and preferably decrease to less than 100 cp at the elevated processing temperature. The resin is preferably an epoxy resin, although other thermosetting resins such as polyurethanes or polyesters can also be employed. The thermosetting resin which is used also should be one whose gel time is sufficiently long such that the foam core can expand without interference by a prematurely gelling thermosetting resin. The rheology of the resin, its gel time as a function of temperature and its curing properties all contribute to the manufacturing process and the resulting product properties, particularly the stiffness and impact strength.

Following the injection of the epoxy resin, the mold is heated. Heat is transferred from the mold through the thermosetting resin to the foam core. Once the temperature of the core reaches the temperature of expansion of the core material, the foam core non-reversibly expands such that the wrapped surface of the core is forced against the confining surface of the mold. The major factor which regulates the temperature of the molding step is that the temperature must be at least that which is the temperature at which the particular core material being used will expand. The thermosetting resin which is injected into the mold must maintain its liquid state long enough until the foam has fully expanded against the interior mold surfaces and expelled all excess resin from the mold through a vent provided in the mold. Once the foam core has expanded, the thermosetting resin should be formulated to rapidly harden and cure. Accordingly, the curing properties of the thermosetting resin must be consistent with this stated profile of the molding step. The molded core is then cooled and the object is removed from the mold.

The thickness of the outer layer of the cured product laminate which consists of hardened thermoset resin impregnated fabric is determined by the thickness of the wrapped layer. The thickness of the layer may vary widely, but usually ranges from a minimum thickness of about 0.25 mm to just about any greater thickness desired with a usual maximum thickness of up to about one cm.

The temperature which is used in the molding process should closely match the expansion temperature of the core or mandrel material as stated. Obviously, if the temperature is not high enough, the foam core will never expand and the process will not work. For the specific core materials described above, polyimides generally expand at temperatures ranging from about 149° to about 205° C., while polyvinyl chloride resins generally expand at temperatures ranging from about 104° to about 163° C. and polyurethane resins expand at temperatures ranging from about 65° to about 107° C.

An aspect of the molding process is that the mold portions provide the means of heating selected areas of the rigid foam core within the mold such that areas of the rigid foam core can be uniformly heated to allow a controlled rate of expansion of the rigid foam core before other areas of the rigid foam core are heated. In fact, in extreme cases the selective heating process can be conducted so as to only apply heat to a given area of the rigid foam core, while other areas of the rigid foam core experience no heating whatsoever until the aforesaid heating and expansion of rigid foam core material is accomplished.

Figure 1:
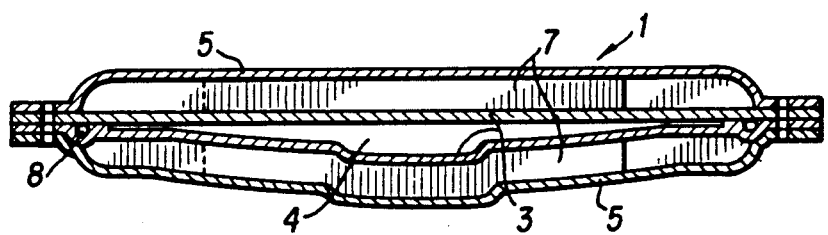
FIG. 1 is a cross-sectional view of a mold for conducting the TERTM process of the invention.

The selective heating aspect of the method is provided by the construction of the mold portions which are exemplified in the mold half of FIG. 1 and the cross-section of a complete mold shown in FIG. 2. Vertical baffles 7 are placed in spaced apart relationship within the hollow interior of each mold portion between the exterior and interior metal surfaces of each mold portion. These baffles provide the mold portions or halves, as the case may be, with strength which prevents deformation of the mold portions or halves during use, while at the same time defining the flow pattern of the heated fluid which is passed into each mold portion which provides the heat required for uniform and controlled expansion of the rigid foam core. As the heated fluid passes into a given mold portion, the baffles define the channeled flow pattern of the heated fluid within the mold interior so that a selected portion of the interior mold surface is heated to supply the heat necessary to expand the corresponding selected area of the rigid foam core within the mold. If a non-selective heating regimen is desired, enough heated fluid is supplied to each mold portion to fill the entire hollow interior of each mold portion so that the entire mass of rigid foam core is expanded.

Various techniques can be employed to selectively heat a rigid foam core within a mold. Referring to FIG. 2, selective heating of a rigid foam core can be achieved by injecting heated fluid through inlet 13 into the hollow interior of the mold portion in an amount and with a channeled flow pattern such that the heated fluid provides the heat necessary for the lower and middle regions of the rigid foam core. Once these areas of the foam core have expanded, additional heated fluid can be passed into the hollow interior of the mold portion such that the remaining top portion of the rigid foam core is heated for expansion. To complete the selective heating process enough heated fluid is passed into the hollow interior of each mold portion until excess thermoset resin escapes from a vent in the top of the mold.

Another alternative mold construction for selective heating would be to so construct the mold with interior baffles in appropriate positions such that two or more isolated interior regions are established within the hollow interior of a given mold portion with each of the interior regions being provided with a fluid inlet and a fluid vent. This technique provides for the selective heating of a given area of the rigid foam core as each individual interior region of a mold portion is filled with heated fluid.

The present invention also embraces any other mold modification and fluid low pattern which achieves the heated of selected areas of the rigid foam core within a mold.

The mold which is used in the process of the present invention can be constructed of most any kind of commonly available metals with nickel and aluminum being the preferred metals. Most preferred of the metals is nickel because of its excellent durability and heat transfer characteristics, and because of economic considerations.

FIGS. 1 and 2 show typical cross-sectional and top views respectively of a mold of preferred construction which in this case is used in the production of paddles. The mold provides for the fabrication of the blade portion of the paddle. The view of FIG. 1 shows the internal confining surfaces 3 of a mold 1 which enclose void space 4 in which a wrapped mandrel is expanded. The mold has external surfaces 5. The internal and external surfaces within each half of the mold are separated by a hollow interior containing spacing baffles 7.

FIG. 2 is a top view of a mold half having external surface 5 under which is placed a series of baffles 7 within the hollow interior of the mold half. Bolt holes 9 are shown around the periphery of the mold which provides sites by which the mold halves can be secured in position against each other around sealing groove 8. A flexible elastomer or rubber cord such as a silicone rubber cord is placed within the groove such that when the two halves of the mold are bolted together, the cord is compressed and seals against any leakage of the thermosetting resin after it has been injected into the cavity. Injection port 11 in communication with the interior of the mold through channel 10 is shown where low viscosity liquid thermosetting resin is injected into the mandrel filled void space of the mold. Inlet port 13 provides an opening into the void space between the outer and inner surface of the mold which contains the supporting baffles through which a liquid can be injected in order to provide heat for the molding process.

The preferred nickel mold of the present invention is prepared by electrodepositing a layer of metal of the conforming surface of a master to form the inner surface of one half of the mold. Normally, the metal is deposited to a thickness of about one quarter of an inch. Thereafter, steel baffles 7 as shown in FIGS. 1 and 2, are placed in position over the electrodeposited metal layer and are welded into position on the metal surface. The baffles normally are about on half inch tall although the height factor may be varied as required. The void spaces between the baffles are then filled with a wax, and then the fabrication is immersed into a nickel electroplating bath where another nickel layer is deposited over the wax and baffles to form the exterior housing of the mold half. The fabrication is removed from the electroplating bath and then is warmed in order to melt the wax for its removal from the interior of the mold half. The other half of the mold can then be fabricated in the same manner as described above. The baffles within the mold halves serve the important functions of being elements of construction which add strength to the mold halves and control the flow path of the heating fluid, which can be the likes of steam or oil, through the mold half.

Having now fully described this invention, it will be apparent to one or ordinary skill in the art that many changes and modifications can be made thereto within departing from the spirit of the invention as set forth herein.

What is claimed is:

1. A method of forming a composite sandwich core molded article, comprising:
    (a) preforming a thermo-expandable rigid foam core into
    (b) wrapping the preformed foam core with a fabric;
    (c) placing said wrapped preformed foam core in a mold whose inner confining surfaces form the shape of the final article and which provides the capability of heating selected areas of said preformed foam core;
    (d) injecting a liquid thermosetting resin into the mold such that the thermosetting resin surrounds and wets the fabric wrapped about the preformed foam core;
    (e) selectively heating desired areas of the mold to a temperature sufficient to expand the rigid foam core under the areas of the mold being heated to compress the fabric wrapped surface of the foam core against the inner confining surfaces of the mold and completing the heating of the rigid foam core to complete the molding process; and
    (f) cooling the mold and removing the article.

2. The method of claim 1, wherein said rigid foam core is shaped in step (a) by direct molding with heat.

3. The method of claim 1, wherein said rigid foam core is shaped in step (a) by compression molding with heat.

4. The method of claim 1, wherein said mold provides said selective heating capability by virtue of its construction which comprises at least two mold portions defining a mold cavity when brought together, at least one said mold portion comprised of spaced apart exterior and interior surfaces, said interior surface adjacent said mold cavity, said exterior and interior surfaces defining a hollow interior therebetween, in which a series of vertical baffles are placed in spaced apart relationship within the hollow interior between the exterior and interior metal surfaces of said mold portion with a hollow interior; and wherein said selective heating of said rigid foam core is achieved by passing a fluid heated to the desired temperature into said mold portion having a hollow interior so that the fluid flows into the hollow interior of said mold portion in a pattern which is defined by said baffles in order to provide a uniform distribution of heat to effect a controlled rate of expansion of the selected area of said rigid form core being heated.

5. The method of claim 4, wherein the molding process is completed by allowing said heated fluid to flow through all regions of the hollow interior of each mold portion to provide the heat necessary for the complete expansion of said rigid foam core.

6. The method of claim 4, wherein the composite molded article being formed is the blade of a paddle, and wherein the molding of the blade is effected by initially selectively heating the interior confining surfaces of each mold portion which define the broad surface area of the blade and then completing the molding of the blade by heating that portion of the foam core which is joined to the shaft of the paddle.

7. The method of claim 4, wherein the mold of step (c) is made of nickel.

8. The method of claim 1, wherein said fabric is compressed by the expanding foam core at 100 psi.

9. The method of claim 1, wherein the shape of the confining surfaces of the mold define the structure of the blade of a paddle.

10. The method of claim 1, wherein the heat expandable material of the rigid foam core is polyvinyl chloride, a polyurethane or a polyimide.

11. The method of claim 1, wherein said thermosetting resin is a low viscosity epoxy resin formulated with a gel time which is sufficiently long so as not to interfere with the expansion of the rigid foam core.

12. The method of claim 1, wherein the thermosetting resin has a viscosity of less than 8000 cp.

13. The method of claim 1, wherein the fabric wrapping of step (b) is a dry fabric, a prepreg or combination thereof.

14. The method of claim 1, wherein the dry fabric wrapping is made of aramid, fiberglass, graphite or polyester.

15. The method of claim 1, wherein the fabric wrapping is a prepreg material.

16. The method of claim 1, wherein during the expansion of the foam core in step (e), excess thermosetting resin is expelled from the interior of the mold.

17. A method of forming a composite sandwich core molded article, comprising:
   a) preforming a thermo-expandable rigid foam core into desired shape by molding of a resin selected from the group consisting of polyimides, polyvinyl chlorides, and mixtures thereof;
   b) wrapping the pre-formed foam core with a fabric;
   c) placing said wrapped pre-formed foam core in a mold whose inner confining surfaces form the shape of the final article and which provides the capability of heating selected areas of said pre-formed foam core;
   d) injecting a liquid thermosetting resin into the mold such that the thermosetting resin surrounds and wets the fabric wrapped about the pre-formed foam core;
   e) selectively heating desired areas of the mold to a temperature sufficient to only apply heat in a given area of the rigid foam core, while other areas of the rigid foam core experience no substantial heating to expand the rigid foam core under the areas of the mold being heated to compress the fabric wrapped surface of the foam core against the inner confining surfaces of the mold and completing the heating of the rigid foam core to complete the molding process; and
   f) cooling the mold and removing the article.

18. The method of claim 17, wherein said mold provides said selective heating capability by virtue of its construction which comprises at least two mold portions defining a mold cavity when brought together, at least one said portion comprised of spaced apart exterior and interior surfaces, said interior surface adjacent said mold cavity, said exterior and interior surfaces defining a hollow interior therebetween, in which a series of vertical baffles are placed in spaced apart relationship within the hollow interior between the exterior and interior metal surfaces of said mold portion; and wherein said selective heating of said rigid foam core is achieved by passing a fluid heated to the desired temperature into said mold portion having a hollow interior so that the fluid flows into the hollow interior of said mold portion in a pattern which is defined by the said baffles in order to provide a uniform distribution of heat to effect a controlled rate of expansion of the selected area of said rigid foam core being heated.

19. The method of claim 18, wherein the molding process is completed by allowing said heated fluid to flow through all regions of the hollow interior of each mold portion to provide the heat necessary for the complete expansion of said rigid foam core.

20. The method of claim 18, wherein the composite molded article being formed is the blade of a paddle, and wherein the molding of the blade is effected by initially selectively heating the interior confining surfaces of each mold portion which define the broad surface area of the blade and then completing the molding of the blade by heating that portion of the foam core which is joined to the shaft of the paddle 21. The method of claim 18, wherein the mold of step (c) is made of nickel.

22. The method of claim 17, wherein the pressure of compression exerted by the expanding foam core is as high as 100 psi.

23. The method of claim 17, wherein the shape of the confining surfaces of the mold define the structure of a paddle blade.

24. The method of claim 17, wherein said thermosetting resin is a low viscosity epoxy resin formulated with a gel time which is sufficiently long so as not to interfere with the expansion of the rigid foam core.

25. The method of claim 17, wherein the thermosetting resin has a viscosity of less than 8000 cp.

26. The method of claim 17, wherein the fabric wrapping of step (b) is a dry fabric, a prepreg or combination thereof.

27. The method of claim 17, wherein the dry fabric wrapping is made of aramid, fiberglass, graphite or polyester.

28. The method of claim 17, wherein the fabric wrapping is a prepreg material.

29. The method of claim 17 further comprising expelling excess thermoset resin from the interior of the mold during the expansion of the foam core (e).

30. A method of forming a composite sandwich core molded article, comprising:
   providing a thermo-expandable preformed foam core wrapped with reinforcing fiber;
   placing said fiber wrapped preformed foam core in a mold whose inner confining surfaces form the shape of the final articles and which provides the capability of selectively heating areas of said fiber wrapped preformed foam core;
   injecting a liquid thermosetting resin into the mold such that the thermosetting resin surrounds and wets the fiber wrapped about the preformed foam core;
   heating selected mold areas to a temperatures sufficient to expand the preformed foam core adjacent said selected areas to compress the wetted fiber against the inner confining surfaces of the mold in said selected areas, to expand the rigid foam core in said areas while other areas of the rigid foam core experience no substantial heating prior to heating to complete the molding step, heating remaining areas of said foam core to complete the molding process; and
   cooling the mold and removing the article.

31. The method of forming a composite sandwich core molded article of claim 30 and wherein the fiber is chosen from the group consisting of: graphite, aramid, fiberglass and polyester.

32. The method of forming a composite sandwich core molded article of claim 30 and wherein the fiber is in the form of a unidirectional fabric, a woven fabric, a knitted material, a braided material, filaments, or hybrid braided fabric.

33. The method of claim 32 wherein the fiber is part of a prepreg fabric.

34. The method forming a composite sandwich core molded article of claim 30 and wherein the preformed foam core is provided by a method comprising:
   forming a thermo-expandable rigid foam core into desired shape.

35. The method of forming a composite sandwich core molded article of claim 34 and wherein the forming step includes direct molding with heat.

36. The method of claim 34 and wherein the forming step includes compression molding with heat.

* * * * *